June 21, 1966      E. GÖTZ      3,257,550

SUBTRACTING ARRANGEMENT

Filed Feb. 8, 1963      2 Sheets-Sheet 1

Inventor
Elmar Götz

By Spencer & Kaye
Attorneys

United States Patent Office

3,257,550
Patented June 21, 1966

3,257,550
SUBTRACTING ARRANGEMENT
Elmar Götz, Frankfurt-Gravenbruch, Germany, assignor to Licentia Patent-Verwaltungs-G.m.b.H., Frankfurt am Main, Germany
Filed Feb. 8, 1963, Ser. No. 257,186
Claims priority, application Germany, Feb. 12, 1962, L 41,215
7 Claims. (Cl. 235—175)

The present invention relates to an arrangement for subtracting two natural binary numbers, which numbers are realized by direct current voltages, these binary numbers being, for example, nominal and actual values.

Digital numbers are used more and more in the machine control art. There exist, for instance, machine control systems in which digital numbers are used as information, the numbers being, for example, in the form of digital D.C. voltage signals. Such systems use comparison members which receive the nominal and actual values in the form of natural binary numbers, which numbers are realized as D.C. voltages of different potential. In many cases, it is desired that the comparison members put out both the magnitude and algebraic sign of the difference between the two numbers. One practical application of this is in control systems for machine tools in which a work tool operates on a work piece. The position of the work tool relative to the work piece is controlled in accordance with a predetermined program which puts out the so-called "nominal" value, i.e., the desired or intended position which the tool is to occupy relative to the work piece while the "actual" value is, as the name implies, representative of the position which the tool actually occupies relative to the work piece, this last-mentioned position being measured by suitable gauges. The nominal value put out by the program is compared with the actual position measured by the gauges, so that the position of the tool may be brought to, or at least more closely to, the nominal value. The comparison should thus show the absolute numerical difference between the nominal and actual values, and also the direction in which the actual value differs from the nominal value, i.e., the algebraic sign of the difference.

It is, therefore, an object of the present invention to provide an arrangement for carrying out the above subtraction which arrangement is constituted by modules which are as similar to each other as possible, and which arrangement is as proof as possible against outside noise pulses.

With the above objects in view, the present invention resides in an arrangement for subtracting natural binary numbers, which numbers may represent nominal and actual values, which arrangement puts out the amount and algebraic sign of the difference. In particular, the arrangement according to the present invention is characterized by the following features:

(A) Each digit of the binary numbers has assigned to it a subtracter for two binary numbers (e.g., A and B) and a carry.

(B) The carry of each subtracter, except the one assigned to the highest-order digit, is applied to the subtracter of the next higher-order digit, and so on.

(C) The carry of the subtracter assigned to the highest-order digit is fed back into such subtracter as well as into the other subtracters.

(D) The arrangement subtracts, under the control of the carry signal from the subtracter assigned to the highest-order digit, the number A (e.g., the actual value) from the number B (e.g., the nominal value) or vice versa; assuming A to be larger than B, when the arrangement carries out the subtraction A minus B, there is a positive difference, whereas when the arrangement carries out the subtraction B minus A, there is a negative difference. The result obtained is put out and the carry signal of the subtracter of the highest-order subtracter is used for indicating the algebraic sign of the result which is put out.

Additional objects and advantages of the present invention will become apparent upon consideration of the following description when taken in conjunction with the accompanying drawings in which.

Figure 1:
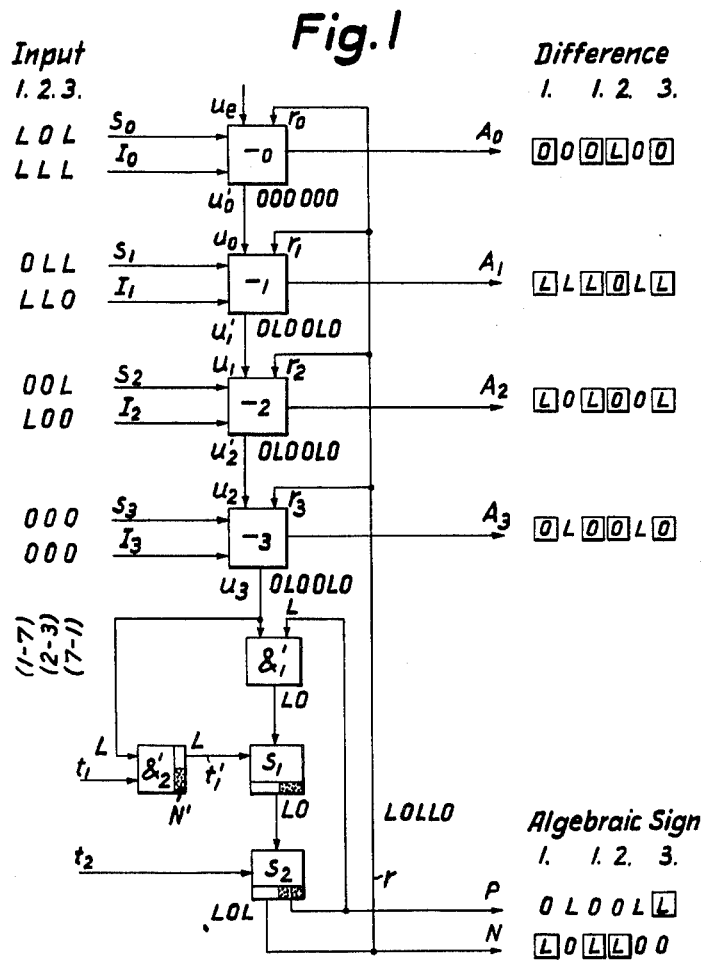
FIGURE 1 is a schematic diagram of a subtracting arrangement according to the present invention.

Referring now to the drawings and to FIGURE 1 thereof in particular, the same shows an arrangement for subtracting two binary digits. The circuitry includes sufficient components to process four-digit binary numbers, it being understood that the system can be expanded to handle as many digits as necessary, as, for example, the 20-digit binary numbers presently used in the digital control of machine tools.

The arrangement comprises four subtracters $-_0$, $-_1$, $-_2$, $-_3$ assigned to the binary digits $2^0$, $2^1$, $2^2$, $2^3$, respectively.

Each subtracter has an input $S_0$, $S_1$, $S_2$, $S_3$, to which is applied, for example, a D.C. voltage signal corresponding to one of the binary numbers to be compared (e.g., the nominal value). The subtracters have further inputs $I_0$, $I_1$, $I_2$, $I_3$ to which are applied the D.C. voltage signals corresponding to the other binary number (e.g., the actual value).

The D.C. voltage signals are symbolized by the values $L$ (=binary 1) and 0. Thus, the value L can, for example be the value corresponding to a negative potential and the value 0 be the ground potential, or vice versa.

The subtracters have still further inputs $u_e$, $u_0$, $u_1$, $u_2$ to which the signals 0 or L are applied. In the case of subtracter $-_0$, the incoming carry $u_e=0$. The outgoing carry $u'_0$ of the lowest-order subtracter $-_0$ is applied to the carry input $u_0$ of the subtracter $-_1$; the outgoing carry $u'_1$ of subtracter $-_1$ is applied to the carry input $u_1$ of the next subtracter $-_2$; and the outgoing carry $u'_2$ of subtracter $-_2$ is applied to the carry input $u_2$ of the next and highest-order subtracter $-_3$. The subtracters have further inputs $r_0$, $r_1$, $r_2$, $r_3$, to which is applied, via a logic network comprising an AND-circuit $\&'_1$, an AND/AND NOT-circuit $\&'_2$, $N'$, and pulsable storage devices $S_1$ and $S_2$, the outgoing carry $u_3$ of the highest-order subtracter $-_3$.

The subtracters also have number outputs $A_0$, $A_1$, $A_2$, $A_3$.

The signal of the outgoing carry $u_3$ of subtracter $-_3$ also appears at a negative output N for indicating that the algebraic sign of the difference is negative and at a positive output P for indicating that the algebraic sign of the difference is positive. The positive output P is connected to the negated output of the storage device $S_2$, as indicated by the black area, while the negative output N is connected to the affirmed output indicated by the white area.

The operation of the arrangement will be explained with the aid of three numerical examples, noted in FIGURE 1.

*Example 1*

Assume that the input applied to inputs $S_0$ through $S_3$ is 000L (decimal 1), representing a nominal value, from which is to be subtracted the actual value, as measured by gauges, 0LLL (decimal 7). A larger number (here the actual value) is thus to be subtracted from a smaller number (here the nominal value).

Let it be assumed that the arrangement is now first put into operation. In that case, storage device $S_2$ can be in one condition or the other so that the signal appearing at the affirmed output may be either 0 or L. If, when the circuit is turned on, the signal at the affirmed output of storage device $S_2$ happens to be L, such signal is assumed to be a command for the subtracters $-_0$ through $-_3$ to subtract whatever is at input $S_0$ through $S_3$ from whatever is at inputs $I_0$ through $I_3$, in this case to subtract the smaller nominal value 000L from the larger actual value 0LLL, so that after the subtraction is carried out, there will be a carry signal at $u_3$ which equals 0; this signal will have no effect on the logic circuit incorporating the storage means constituted by elements $\&'_1$; $\&'_2$, N; $S_1$; $S_2$, so that despite the appearance of new carry signals 0, the signal L remains at output N. Thus, when the lead $r$ to which inputs $r_0$ through $r_3$ are connected carries a potential corresponding to the binary signal L, it will always be the nominal value which is subtracted from the actual value, irrespective of whether the value at $S_0$ through $S_3$ is smaller or larger than the value at $I_0$ through $I_3$.

Conversely, if the leads to which $r_0$ through $r_3$ are connected carries the signal 0, it will be the value at $I_0$ through $I_3$ which is subtracted from the value at $S_0$ through $S_3$.

In other words:

If, upon turning on of the circuit, the signal L appears at inputs $r_0$ through $r_3$, the arrangement carries out the operation: I minus S, and, in the instant example, the smaller value 000L is at once subtracted from the larger value 0LLL, and, because of this inversion of the subtraction, the carry $u_3$ at once becomes 0, as noted.

Figure 2:
FIGURE 2 is a clock pulse diagram showing the timed relationship of two clock pulse trains.

If, upon turning on of the circuit, the signal appearing at inputs $r_0$ through $r_3$ is 0, the arrangement performs the operation: S minus I, and, in the instant example, the result will be the nominal value minus the actual value. In the example, what is at that moment the minuend is smaller than what at that moment is the subtrahend. Consequently, the carry output signal $u_3$ will equal L, as noted. In this case, i.e., the case where the affirmed output of storage device $S_2$ is, at the start, 0, there will be a signal L applied from the negated (right-hand) output of storage device $S_2$ to the right-hand input of AND-circuit $\&'_1$. (Note that whenever a signal L appears at one of the two outputs of storage device $S_2$, the signal 0 appears at the other.) The carry $u_3=L$, applied to the left-hand input of AND-circuit $\&'_1$, is thus applied to the information input of the pulsable storage device $S_1$. Furthermore, the carry signal $u_3=L$ is applied to one input of a further AND-circuit $\&'_2$ which functions as a cut-off. AND-circuit $\&'_2$ is activated by clock pulses $t_1=L$ or 0, as shown in FIGURE 2. When clock pulse $t_1=L$, AND-circuit $\&'_2$ is rendered conductive and the carry $u_3=L$ is passed, via an AND NOT-circuit N' connected to the output of AND-circuit $\&'_2$, as a signal $t'_1=L$ to the pulse input of storage device $S_1$, thereby opening the latter so that the same is able to receive the signal L appearing at its information input. The signal L appearing at the affirmed output of storage device $S_1$ is taken over by storage device $S_2$ as soon as the latter is pulsed by a clock pulse signal $t_2=L$, so that the signal 0 which was assumed to appear at the affirmed output of storage device $S_2$ is changed to L, as indicated. As shown in FIGURE 2, the clock pulse $t_2=L$ always appears after the clock pulse $t_1=L$. The lead $r$ to inputs $r_0$ through $r_3$ will thus also have the signal L, this being the command for the subtracters to perform the operation I minus S, or actual value minus nominal value. Inasmuch as the actual value is larger than the nominal value, there will, after the smaller value has been subtracted from the larger, be a carry $u_3=0$. The carry signal $u_3$ which, up to now, was equal to L, has now become equal to 0, as, of course, it should. The signal L, however, still appears at the lead $r$ to inputs $r_0$ through $r_3$, because, due to the cut-off stage constituted by the AND/AND NOT-circuit $\&'_2$, N, the storage device $S_1$ has not been opened, so that the new carry signal $u_3=0$ can not be taken over by storage device $S_1$.

The output N presents the signal L which shows that the result is negative, which corresponds to the assumed subtraction of 000L minus 0LLL.

Considering now the possibility that, upon turning on of the circuit, it is the signal L which appears at the lead to inputs $r_0$ through $r_3$ (as indicated at the left next to the affirmed output of storage device $S_2$), the following occurs. It was assumed that the smaller value 000L is then immediately subtracted from the larger value 0LLL. This occurs as follows: subtracter $-_0$ assigned to the lowest-order binary digit subtracts $I_0(=L)$ minus $S_0(=L)$; this produces an output $A_0=0$ and a carry $u'_0=0$, the latter being applied to the next-higher order subtracter $-_1$. Subtracter $-_1$ subtracts $I_1(=L)$ minus $S_1(=0)$; this produces an output $A_1=L$ and a carry $u'_1=0$. The latter is applied to the next subtracter $-_2$, which subtracts $I_2(=L)$ minus $S_2(=0)$, thereby producing an output $A_2=L$ and a carry $u'_2=0$. The latter is applied to subtracter $-_3$, which subtracts $I_3(=0)$ minus $S_3(=0)$, thereby producing an output $A_3=0$ and a carry $u_3=0$.

Considering now the possibility that, upon turning on of the circuit, the signal 0 appears at the lead to inputs $r_0$ through $r_3$ (as indicated by the second from the left at the affirmed output of storage device $S_2$), which 0 signal is a command for the subtracters to subtract the actual value from the nominal value, i.e., to carry out the operation: S minus I. The operation is then as follows:

Subtracter $-_0$ subtracts $S_0(=L)$ minus $I_0(=L)$, thereby producing an output $A_0=0$ and a carry signal $u'_0=0$, the latter being applied to subtracter $-_1$. Subtracter $-_1$ subtracts $S_1(=0)$ minus $I_1(=L)$, thereby producing an output $A_1=L$ and an outgoing carry $u'_1=L$ which is applied to the next subtracter $-_2$. The latter subtracts $S_2(=0)$ minus $I_2(=L)$, and this produces an intermediate result L and an outgoing carry $u'=L$. This intermediate result has the incoming $u_1=L$ subtracted from it, so that the ultimate output signal at $A_2=0$. The outgoing carry $u'_2=L$ is applied to subtracter $-_3$. The latter subtracts $S_3(=0)$ minus $I_3(-0)$ minus $u_2(=L)$ to produce an output signal $A_3=L$ and an outgoing carry $u_3=L$. The result L0L0 appearing at outputs $A_0$ through $A_3$ at this time is wrong. However, the outgoing carry signal $u_3=L$ now appears at the lead $r$ to $r_0$ through $r_3$, which heretofore was at 0, so that the subtracters $-_0$ through $-_3$ are commanded to invert their subtraction.

Subtracter $-_0$ now subtracts $I_0$ minus $S_0$, to produce an output $A_0=0$ and an outgoing carry $u'_0=0$. The next subtracter $-_1$ subtracts $I_1$ minus $S_1$ to produce an output signal $A_1=L$ and an outgoing carry $u'_1=0$. The next subtracter $-_2$ subtracts $I_2$ minus $S_2$ to produce an output signal $A_2=L$ and an outgoing carry $u'_2$. The subtracter $-_3$ subtracts $I_3$ minus $S_3$ to produce an output signal $A_3=0$ and an outgoing carry $u_3=0$. It will thus be seen that the values 0LL0 (decimal 6) appearing at outputs $A_0$ through $A_3$, noted within frames, are correct. Inasmuch as the outgoing carry signal $u_3=L$ produced during the preceding subtraction was stored by the storage devices $S_1$, $S_2$, this signal L still appears, as part of the final result, at output N (within the frame) and indicates a negative result.

*Example 2*

Let it now be assumed that the very next operation is one in which the system is to perform the operation 00L0 minus 00LL. The nominal value input 00L0 (decimal 2) is again smaller than the actual value input 00LL (decimal 3), as indicated in the second vertical column at the left of FIGURE 1. The start of this calculation finds the circuit as it was at the end of the previous calculation, namely, $u_3=0$, $r_0$ through $r_3=L$, $N=L$.

The signal L at $r_0$ through $r_3$ commands the system to produce the result I minus S, or actual value minus nominal value. Since in the instant example the actual value is larger than the nominal value, there is an immediate reversal of the subtraction by the subtracters $-_0$ through $-_3$, and the carry $u_3$ remains 0. Nothing changes in the state of the components connected to the output $u_3$, i.e., the AND-circuits $\&'_1$, $\&'_2$, and the storage devices $S_1$, $S_2$. This is as it should be because, due to the negative result which will be obtained, the output signal at N should remain L, in view of the fact that in the second example, as in the first, the nominal value is smaller than the actual value. Also, the signal L remains at the lead to inputs $r_0$ through $r_3$.

*Example 3*

Finally, let it be assumed that the very next operation is to be S minus I, wherein the nominal value input S is 0LLL (decimal 7) and the actual value input I is 000L (decimal 1), and therefore a case in which the minuend (the nominal value) is larger than the subtrahend (the actual value), as indicated in the third vertical column at the left of FIGURE 1.

The lead $r$ to inputs $r_0$ through $r_3$ still has the signal L applied to it, this, as explained above, being a command to form the result actual value minus nominal value. Inasmuch as the actual value is smaller than the nominal value, the result which will at first appear at the outputs $A_0$ through $A_3$ is doomed to be wrong, as shown at the right of these outputs by the unframed values. For the same reason, the previous signal 0 at carry $u_3$ is now replaced by the signal L.

The previous subtraction will have left the signal 0 at the output of AND-circuit $\&'_1$ and therefore at the input of storage device $S_1$. Upon the occurrence of the clock pulse $t_1=L$, the carry $u_3=L$ of the present subtraction is applied to the pulse input of storage device $S_1$, thereby opening the same so that this storage device can take over the signal 0 which appears at its input. This new carry signal $u_3=L$ can not, however, reach the storage device $S_1$ because the right-hand input of AND-circuit $\&'_1$ has the signal 0 applied to it. The stored signal 0 appears at the affirmed output of the storage device $S_1$ and, upon occurrence of clock pulse $t_2=L$, is taken over by storage device $S_2$ so as to appear at the affirmed input thereof. Consequently, the signal L at output N becomes 0 and the signal 0 at output P becomes L. At the same time, the lead $r$ to inputs $r_0$ through $r_3$ carries the new signal 0. The subtracters therefore invert their wrong subtraction and now subtract correctly and in the required manner, namely, nominal value 0LLL minus actual value 000L, to produce the result 0LL0 shown by the framed values at the right of outputs $A_0$ through $A_3$, the carry $u_3$ being 0. The signal L, whose appearance is indicative of the algebraic sign of the result, is to be found at output P which, of course, means that the result is positive.

The numerical result, the signal indicative of the algebraic sign, and the carry signal remain where they are until new nominal and actual values are applied to the system.

Figure 3:
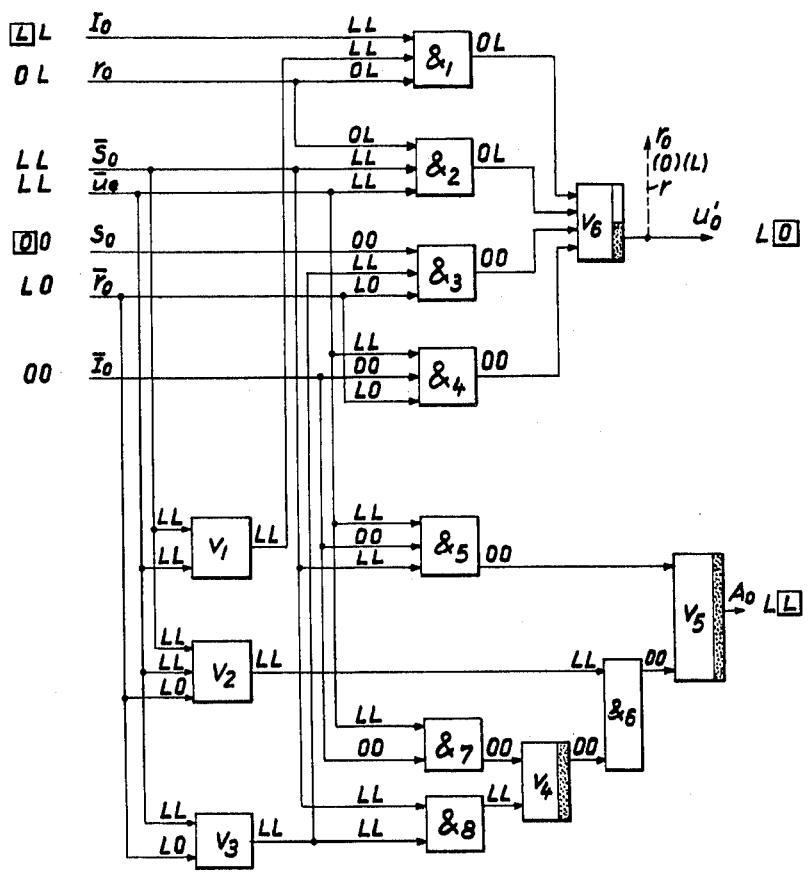
FIGURE 3 is a schematic diagram of a subtracter of the type used in the arrangement of FIGURE 1.

FIGURE 3 shows one embodiment of a subtracter such as may be used in the system of FIGURE 1, the subtracter illustrated being assumed to be the subtracter $-_0$ assigned to the lowest-order digit. FIGURE 3 also shows the numerical values taken from Example 2. Thus, the inputs $S_0$ and $I_0$ have the values 0 and L, respectively, applied to them, as shown by the framed values. The subtracter also has applied to it the inverses of $I_0$ and $S_0$, which are readily derived from $I_0$ and $S_0$ by means of NOT-circuits (not shown). These negated inputs are indicated at $\bar{S}_0$ and $\bar{I}_0$ and equal, respectively, L and 0. In the arrangement according to FIGURE 1, it was assumed that the signal applied to $u_e$ was constantly equal to 0 because there is no carry which can appear at the lowest-order binary digit. The subtracter shown in FIGURE 3 has an input $\bar{u}_e$ to which is applied the negate of 0, namely, signal L. The subtracter further has inputs $r_0$ and its negate $\bar{r}_0$ for receiving the command signals which instruct the subtracter to form the result S minus I or the result I minus S. The negated signals $\bar{u}_e$ and $\bar{r}_0$ are likewise derived from the affirmed counterparts by means of NOT-circuits (not shown), at whose outputs the negate of the affirmed values appear.

The subtracter comprises eight AND-circuits $\&_1$, $\&_2$, $\&_3$, $\&_4$, $\&_5$, $\&_6$, $\&_7$, $\&_8$, three OR-circuits $v_1$, $v_2$, $v_3$, two OR/NOT-circuits $v_4$, $v_5$, and an OR/OR NOT-circuit $v_6$, the specific arrangement thereof being explained in conjunction with the operation.

The subtracter output $A_0$ is the output of the OR/NOT-circuit $v_5$, while the output indicative of the algebraic sign is the negated output of the OR/OR NOT-circuit $v_6$. The output $u'_0$ is applied via lead $r$ and the storage circuit (not shown in FIGURE 3) to input $r_0$.

Let it be assumed that at the start of operation the subtracter of FIGURE 3 has the signal 0 appearing at $u'_0$, as indicated in parentheses. According to Example 2 of FIGURE 1, the actual value (L) is greater than the nominal value (0). This is noted in the left-hand vertical column. The negated input signals, being derived from the affirmed input signals, will of course, be opposite so that L and 0 are applied to inputs $\bar{S}_0$ and $\bar{I}_0$, respectively. Inasmuch as it is assumed that the incoming carry $u_e=0$, the negate thereof is L, which value is applied to input $\bar{u}_e$. Finally, since $r_0=0$, its negate L is applied to $\bar{r}_0$.

FIGURE 3 shows the inputs L being applied to OR-circuits $v_1$, $v_2$, $v_3$. The output of each of the OR-circuits will be L, as indicated immediately adjacent these outputs. FIGURE 3 also shows, at the left, the input signals applied to each of the AND-circuits $\&_1$ through $\&_8$. The outputs of each of these AND-circuits will be 0, except for AND-circuit $\&_8$ whose output is L. The output signal of the OR/NOT-circuit $v_4$, to whose inputs the outputs of AND-circuits $\&_7$ and $\&_8$ are connected, will be 0. The output of OR/NOT-circuit $v_4$ and the output of OR-circuit $v_2$ are connected to AND-circuit $\&_6$, whose output is connected to one input of OR/NOT-circuit $v_5$, the other input of the latter being connected to the output of AND-circuit $\&_5$. The outputs of AND-circuits $\&_1$ through $\&_4$ are connected to the inputs of OR/OR NOT-circuit $v_6$. Thus, there appears at the outputs $A_0$ the not yet final signal L. The signal L also appears at the output $u'_0$, but only temporarily. This last mentioned signal L is at the same time applied via lead $r$, as indicated in parentheses, to input $r_0$, as noted in the second vertical row. The 0 value which heretofore prevailed at $r_0$ now becomes L. As noted in the right-hand vertical line, the nominal and actual value inputs remain unchanged. Also, the incoming carry signal $\bar{u}_e$ remains unchanged as L. What has changed, due to $r_0$ now being L, is the signal L which up to now appeared at $\bar{r}_0$, which now becomes 0. The now resulting signals appearing at the inputs of AND-circuits $\&_1$, $\&_2$, $\&_3$ and OR-circuits $v_1$, $v_2$, $v_3$, are noted in the right-hand vertical column. The now prevailing output signals are likewise noted in the corresponding right-hand vertical column. It will be seen that the output signals of the OR-circuits $v_1$, $v_2$, $v_3$, have remained unchanged, nor have the output values of the AND-circuits changed with the exception of AND-circuits $\&_1$, $\&_2$ whose outputs have changed from 0 to L. Consequently, the signal L appearing at output $A_0$ will have survived and will remain as the final result. The change of output of AND-circuits $\&_1$, $\&_2$, however, will cause the signal 0 previously appearing at the carry output $u'_0$ to have changed from L to 0. The two-step subtraction 0 minus L is thus completed.

The above operation will be briefly summarized. With the subtracter being in the assumed starting position, it carries out two operations. At the start, the carry output $u'_0$ signal was assumed to be 0. A larger value $I_0=L$ was to be subtracted from a smaller value $S_0=0$. This subtraction was, because of $r_0=0$, first carried out as a false subtraction $S_0(=0)$ minus $I_0(=L)$, which produced at output $A_0$ the result L as well as a carry, at $u'_0$, of L. This carry L was fed back into the subtracter, which thereafter carried out a true subtraction, this time — because of the new command signal $r_0=L-I_0(=L)$ minus $S_0(=0)$. This produced, at $A_0$, the final result L, the carry signal $u'_0$ then having become 0. However, the carry signal L which appeared during the first step was stored, and the fact that the subtraction resulted in a negative difference was indicated by the appearance of the signal L at output N. The new carry $u'_0=0$ is then applied back to input $r_0$ and the subtracter is ready to carry out the next subtraction.

The input values $S_0=0$ and $I_0=L$ as well as the final output $A_0=L$ and the carry $u'_0=0$ are shown framed.

The various AND-circuits and OR-circuits are, in practice, constituted by diode stages together with their operating resistances. The NOT-stages connected to the outputs of the OR-circuits $v_4$ and $v_5$ are one-stage transistor circuits, while the OR/NOT-circuit connected to the output of OR-circuit $v_6$ is a two-stage transistor amplifier. All of the stages are coupled galvanically to each other, so that there are no capacitative coupling elements at all anywhere in the subtracter. Also, the subtracters of FIGURE 1 are coupled to each other by purely galvanic means, and the same applies to the storage circuits for the carry $u_3$. This renders the system as a whole insensitive to external noise pulses.

The arrangement can be powered, for example, by a positive and negative D.C. voltage of about 12 volts. The binary numbers 0 and L are realized by appropriate D.C. voltage signals which are not at all critical. The binary number L can, for instance, be constituted by a D.C. voltage signal of $-12$ volts, and the binary number 0 by a D.C. voltage signal of about 0 volt.

It will be seen from the above that the system according to the present invention comprises what is, basically, an arrangement for putting out the difference between a first number and a second number, as well as a signal representative of the algebraic sign of the difference. The arrangement incorporates the series of subtracters each of which is assigned to a respective order, each subtracter having a number output ($A_0$ through $A_3$), a carry input ($u_e$, $u_0$, $u_1$, $u_2$), a first number input for receiving a digit from the first number ($S_0$ through $S_3$), a second number input for receiving from the second number a digit which is of the order as the digit of the first number ($I_0$ through $I_3$), a carry output ($u'_0$, $u'_1$, $u'_2$, $u_3$), a control input ($r_0$ through $r_3$), and means which are responsive to a command signal applied to the control input for subtracting the first number from the second number or vice versa, as commanded, as explained in conjunction with FIGURE 2. The carry output of each subtracter, except the subtracter $-_3$ assigned to the highest order, is connected to the carry input of the subtracter assigned to the next higher order. Consequently, when the arrangement carries out the operation: first number minus second number, there will be no carry (i.e., 0) signal appearing at the carry output $u_3$ of the highest-order subtracter if this first number is greater than the second number. However, there will be a signal (i.e., L) appearing at carry output $u_3$ if the second number is greater than the first number.

The arrangement further was shown to include means which connect the carry output $u_3$ of the highest-order subtracter to the control inputs of all subtracters for applying to the control inputs, upon the appearance of a carry signal at $u_3$ (which, of course, is indicative of the fact that the second number was greater than the first number), a command signal (L) which causes the subtracters thereafter to reverse themselves, i.e., to carry out the operation: second number minus first number.

Furthermore, the arrangement was shown to include means for indicating whether or not the command signal was applied to the control inputs of the subtracters. This, it will be appreciated, is important because it gives an indication as to whether the first or the second number was larger. This indication is read off at outputs P and N, and gives a clear indication as to whether the arrangement carried out a "true" subtraction at its first attempt to produce the difference between the two numbers, or whether it was necessary for the arrangement to be commanded to make yet another effort and to do it, this time, by inverting the minuend and subtrahend. This, in turn, is an indication of the algebraic sign of the difference between the numbers which is ultimately read out at the number outputs $A_0$ through $A_3$ of the subtracters.

It will be understood that the above description of the present invention is susceptible to various modifications, changes, and adaptations, and the same are intended to be comprehended within the meaning and range of equivalents of the appended claims.

What is claimed is:

1. An arrangement for subtracting binary numbers, which arrangement puts out the amount of the difference between a first number and a second number and a signal representative of the algebraic sign of said difference, said arrangement comprising, in combination:
   (a) a series of subtracters each being assigned to a respective order, each subtracter having
      (1) a number output,
      (2) a carry output,
      (3) a first number input for receiving a digit from said first number,
      (4) a second number input for receiving from said second number a digit which is of the same order as said digit of said first number,
      (5) a carry input,
      (6) a control input, and
      (7) means responsive to a command signal applied to said control input for subtracting said first number from said second number or vice versa, as commanded, the carry output of each subtracter, except the subtracter assigned to the highest order, being connected to the carry input of the subtracter assigned to the next higher order so that when the arrangement carries out the operation: first number minus second number, there will be no carry signal appearing at the carry output of the highest-order subtracter if said first number is greater than said second number and there will be a carry signal appearing at said last-mentioned carry output if said second number is greater than said first number;
   (b) means connecting the carry output of said highest-order subtracter to the control inputs of all subtracters for applying to said control inputs, upon the appearance of a carry signal at said carry output of said higsest-order subtracter which is indicative of the fact that said second number was greater than said first number, a command signal which causes said subtracters thereafter to carry out the operation: second number minus first number; and
   (c) means for indicating whether or not said command signal was applied to said control inputs of said subtracters, thereby to give an indication as to whether the first or the second number was larger and hence an indication of the algebraic sign of the difference between said numbers which is read out at said number outputs of said subtracters.

2. An arrangement as defined in claim 1 wherein said means (b) comprise storage means for storing the carry signal that comes from the carry output of said highest-order subtracter when said second number is greater than said first number.

3. An arrangement as defined in claim 2 wherein said storage means comprise an AND-circuit having an input connected to the carry output of said highest-order subtracter; a first pulsable storage device having a pulse input and an information input, the latter being connected to the output of said AND-circuit; an AND/AND NOT-circuit having one input connected to the carry output of said highest-order subtracter and a pulse input, the output of said AND/AND NOT-circuit being connected to said pulse input of said first storage device; a second pulsable storage device having a pulse input and an information input, the latter being connected to the output of said first storage device, said second storage device having affirmed and negated outputs, said affirmed output being applied to said control inputs of said subtracters and said negated input being connected to another input of said AND-circuit; and means for sequentially applying clock pulses first to said pulse input of said AND/AND NOT-circuit and then to said pulse input of said second storage device.

4. An arrangement as defined in claim 3 wherein said indicating means comprise first means connected to said negated output of said second storage device for indicating the absence of a carry signal at the carry output of said highest-order subtracter and hence the fact that said first number was larger than said second number, and second means connected to said affirmed output of said second storage device for indicating the presence of a carry signal at the carry output of said highest-order subtracter and hence the fact that said second number was larger than said first number.

5. An arrangement as defined in claim 1 wherein said number output of each subtracter comprises a first OR/NOT-circuit, first and second AND-circuits whose outputs are connected to inputs of said OR/NOT-circuit, the inputs of said first AND-circuit being connected to said number inputs of the respective subtracter and the input of said second AND-circuit being connected to the outputs of a second OR/NOT-circuit and to the output of a first OR-circuit, said second OR/NOT-circuit having its inputs connected to the outputs of third and fourth AND-circuits, the inputs of the latter being connected to said number inputs and to the output of a second OR-circuit; and said carry output of each subtracter comprising fifth, sixth, seventh and eighth AND-circuits, the inputs of the latter being connected to said number inputs, to the output of said second OR-circuit, and to the output of a third OR-circuit, the inputs of said first, second and third OR-circuits being connected to said number inputs.

6. A circuit arrangement comprising, in combination:
(A) a series of subtracters each being assigned to a respective order, each subtracter having a number output, a carry output, a first number input for receiving a digit from a first number, a second number input for receiving from a second number a digit which is of the same order as said digit of said first number, a carry input, a control input, and means responsive to a command signal applied to said control input for subtracting said first number from said second number or vice versa, as commanded, the carry output of each subtracter, except the subtracter assigned to the highest order, being connected to the carry input of the subtracter assigned to the next higher order;
(B) an AND-circuit having an input connected to the carry output of said highest-order subtracter;
(C) a first pulsable storage device having a pulse input and an information input, the latter being connected to the output of said AND-circuit;
(D) an AND/AND NOT-circuit having one input connected to said carry output of said highest-order subtracter and a pulse input, the output of said AND/AND NOT-circuit being connected to said pulse input of said first storage device;
(E) a second pulsable storage device having a pulse input and an information input, the latter being connected to the output of said first storage device, said second storage device having affirmed and negated outputs, said affirmed output being applied to said control inputs of said subtracters and said negated input being connected to another input of said AND-circuit;
(F) means for sequentially applying clock pulses first to said pulse input of said AND/AND NOT-circuit and then to said pulse input of said second storage device; and
(G) indicating means connected to said outputs of said second storage device.

7. A circuit arrangement as defined in claim 6 wherein said number output of each subtracter comprises a first OR/NOT-circuit, first and second AND-circuits whose outputs are connected to inputs of said OR/NOT-circuit, the inputs of said first AND-circuit being connected to said number inputs of the respective subtracter and the input of said second AND-circuit being connected to the outputs of a second OR/NOT-circuit and to the output of a first OR-circuit, said second OR/NOT-circuit having its inputs connected to the outputs of third and fourth AND-circuits, the inputs of the latter being connected to said number inputs and to the output of a second OR-circuit; and said carry output of each subtracter comprising fifth, sixth, seventh and eighth AND-circuits, the inputs of the latter being connected to said number inputs, to the output of said second OR-circuit, and to the output of a third OR-circuit, the inputs of said first, second and third OR-circuits being connected to said number inputs.

No references cited.

ROBERT C. BAILEY, *Primary Examiner.*

M. J. SPIVAK, *Assistant Examiner.*